Patented Jan. 22, 1929.

1,699,646

UNITED STATES PATENT OFFICE.

BAILEY F. WILLIAMSON AND WALTER H. BEISLER, OF GAINESVILLE, FLORIDA.

PROCESS FOR MAKING VARNISH.

No Drawing. Application filed December 30, 1925. Serial No. 78,356.

This invention relates to an improved process for making varnish. The ordinary method consists substantially in heating a drying oil, for example tung oil, with ester gum. Ester gum is commercially prepared by heating ordinary rosin with about 10% of glycerine. The rosin used is prepared in turpentine camps where the theus which exudes from pine trees is caught in a cup hanging on the tree. The crude theus which is a resinoid and always contains more or less foreign matter such as water, chips and other trash, as well as the rosin, is poured into a copper still where it is heated with direct heat. This causes the turpentine to be distilled off and permits the rosin to be drawn off from the bottom of the still and passed through metal strainers and cotton batting to strain out the foreign matter.

This method of producing rosin tends to partially decompose it and therefore results in an inferior product. After the rosin is strained it is poured into barrels in which it is allowed to cool and harden so that it may be shipped to the markets. This shipping ordinarily entails much handling and frequent loss of considerable quantities of rosin, which of course adds greatly to the cost of the finished product.

The object of the present invention is to overcome some of the objections to the method outlined above, and to produce a varnish of higher quality and lighter color than has heretofore been obtainable. Another object is to provide a process whereby such high quality varnish may be produced at a comparatively low cost, and a further object is to provide means whereby oxidation of the ingredients is prevented during the production of the varnish.

Other objects and advantages will become apparent by reference to the following specification wherein we have described our improved process.

In carrying out our process we first heat the crude theus sufficiently to permit straining whereby foreign matter is eliminated. The strained gum theus is then mixed with glycerine and a drying oil, for example tung oil, and is heated gradually in a still, for a period of about three hours to a temperature of 150° C. This initial heating removes all the water and distills off part of the turpentine in the gum theus.

The heating is continued and a non-oxidizing gas, preferably steam, is bubbled through the mixture until the temperature reaches approximately 275° C. during which period the remainder of the turpentine and other miscellaneous light or volatile oils in the gum theus are distilled off. The temperature is then maintained between 275° and 335° C. for a period of about three hours or until the mixture reaches the proper consistency, during which time the flow of non-oxidizing gas is maintained.

When the mixture reaches the desired consistency, the outside heating is discontinued but the passage of steam or non-oxidizing gas is continued until the temperature drops to about 200° C., at which time a suitable quantity of turpentine or other suitable solvent or thinner and any desired drier is added. The mixture is then permitted to cool so that it may be packaged and shipped to the user in accordance with common practice.

The passage of non-oxidizing gas through the mixture in the still drives off the oxygen in the mixture and replaces the air above the mixture which would otherwise cause oxidization and consequently lower the quality of the varnish produced. The passage of this gas also serves to continually agitate the contents of the still whereby the use of a mechanical agitator becomes unnecessary. The agitation of the mixture by this means prevents decomposition of the materials due to local overheating, and a further advantage obtained by the use of gas is found in the fact that the temperature of the mixture is very easily controlled.

A suitable formula for making varnish according to the above described process is as follows:

Mix 100 parts of strained gum theus, 3 parts of glycerine and 150 parts of tung oil in a still and heat gradually during the period of about three hours to 150° C., continue the heating and pass steam through the mixture until the temperature reaches 275° C. Maintain the temperature between 275° and 335° C. until the proper consistency is obtained when the outside heat should be discontinued, but the passage of steam maintained until the temperature drops to about 200° C. Approximately 200 parts of turpentine or other suitable thinner and any desired quantity of drier should be then added and the mixture allowed to cool.

We are aware that changes may be made in the formula and method specified above, without departing from the essence of the invention and therefore reserve the right to make all changes which fall within the scope of the following claims.

We claim as our invention:

1. The improvement in the art of manufacturing varnish, which consists in heating a mixture of clean gum theus, glycerine and a drying oil sufficiently to drive off undesired volatile substances and simultaneously to combine the glycerine with the rosin content of the theus to form the desired gum constituent and incidentally to combine said gum constituent with the drying oil constituent so as to form the varnish base.

2. The improvement in the art of manufacturing varnish, which consists in heating a mixture of clean gum theus, glycerine and tung oil sufficiently to drive off undesired volatile substances and simultaneously to combine the glycerine with the rosin content of the theus to form the desired gum constituent and incidentally to combine said gum constituent with the tung oil constituent so as to form the varnish base.

3. The process of making varnish which consists of heating together gum theus, glycerine and tung oil in a still at a relatively low temperature whereby the water and part only of the turpentine are distilled out, continuing the heating at a higher temperature whereby the remaining turpentine is distilled out and until the desired consistency of the heated mass is obtained, and then cooling and adding the desired thinner.

4. The process of making varnish which consists in heating together gum theus, glycerine and tung oil in a still to a temperature of about 150° C. until the water and part of the turpentine are distilled out continuing the heating at a temperature of substantially 275° C. until the remainder of the turpentine in the gum theus is distilled out, maintaining a temperature between 275° and 335° C. until the mixture reaches the desired consistency, cooling, and thereafter adding thinner.

5. The process of making varnish which consists of mixing substantially 100 parts of gum theus, 3 parts of glycerine and 150 parts of tung oil, heating the mixture gradually during a period of substantially three hours to a temperature of approximately 150° C., raising the temperature to approximately 275° C., and maintaining the temperature between 275° and 335° C. until the mixture is of the desired consistency.

6. The process of making varnish which consists in mixing gum theus, glycerine and tung oil in proportions of substantially 100, 3 and 150 respectively, heating the mixture gradually in a still to approximately 150° C., until the gum theus is converted to ester gum, continuing the heating and passing steam through the mixture until the temperature reaches substantially 275° C., maintaining the temperature between 275° and 335° C. until the desired consistency is obtained, then stopping the heating of the mixture, but continuing the passage of steam therethrough until the temperature drops to substantially 200° C. and then adding thinner.

7. The process of making varnish which consists of heating together gum theus, glycerine, and a drying oil in a still to a temperature whereby the water and part of the turpentine are distilled out, continuing the heating, and passing a non-oxidizing gas through the mixture until the remainder of the turpentine is distilled out and until the desired consistency of the mixture is obtained.

8. The process of making varnish which consists of heating together gum theus, glycerine, and tung oil in a still to a temperature whereby the water and part of the turpentine are distilled out, continuing the heating and passing steam through the mixture until the remainder of the turpentine is distilled out and until the desired consistency of the mixture is obtained.

9. The improvement in the art of manufacturing varnish which consists in heating a mixture of clean gum theus, glycerine and a drying oil in proportion of substantially 100, 3 and 150 respectively, sufficiently to drive off undesired volatile substances and simultaneously to combine the glycerine with the rosin content of the theus to form the desired gum constituent and incidentally to combine said gum constituent with the drying oil so as to form the varnish base.

10. The improvement in the art of manufacturing varnish, which consists in heating a mixture of clean gum theus, glycerine and a drying oil sufficiently to drive off undesired volatile substances and simultaneously to combine the glycerine with the rosin content of the theus to form the desired gum constituent and incidentally to combine said gum constituent with the drying oil constituent so as to form the varnish base and bubbling a non-oxidizing gas through the mixture during part of the time it is so heated.

11. The improvement in the art of manufacturing varnish, which consists in heating a mixture of clean gum theus, glycerine and a drying oil sufficiently to drive off undesired volatile substances and simultaneously to combine the glycerine with the rosin content of the theus to form the desired gum constituent and incidentally to combine said gum constituent with the drying oil constituent so as to form the varnish base and bubbling a non-oxidizing gas through the mixture during part of the time it is so heated thereby producing a varnish of very light color.

12. The process of making varnish, which consists of mixing together, gum theus, glycerine and a drying oil, heating the mixture gradually during a period of about three hours to a temperature of approximately 150° C., raising the temperature to approximately 275° C., and maintaining the temperature between 275° and 335° C., until the mixture reaches a consistency where a cooled portion thereof can be drawn into fine threads.

13. The improvement in the process of making varnish which consists in combining the rosin content of gum theus with glycerine and a drying oil in one operation by heating a mixture of gum theus, glycerine, and a drying oil together in a still, and passing steam through the mixture, while heating it, to agitate the mixture and to facilitate chemical action by the presence of moisture.

14. The improvement in the process of making varnish which consists in combining the rosin content of gum theus with glycerine and a drying oil in one operation by heating such gum theus, glycerine and drying oil together in a still so that the turpentine and light oil content of the gum theus is driven off as an incident to the process.

BAILEY F. WILLIAMSON.
WALTER H. BEISLER.